US010157531B2

(12) United States Patent
Anderson (10) Patent No.: US 10,157,531 B2
(45) Date of Patent: Dec. 18, 2018

(54) TANGIBLE INTERFACE FOR PARTITIONED ENERGY CONSUMPTION

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/198,743

(22) Filed: Jun. 30, 2016

(65) Prior Publication Data

US 2018/0005506 A1    Jan. 4, 2018

(51) Int. Cl.
*G08B 21/18* (2006.01)
*H02J 13/00* (2006.01)
*G05B 15/02* (2006.01)

(52) U.S. Cl.
CPC .......... *G08B 21/182* (2013.01); *G05B 15/02* (2013.01); *H02J 13/00* (2013.01); *Y02D 70/00* (2018.01)

(58) Field of Classification Search
CPC ............................... G08B 21/182; H02J 13/00
USPC ......................................................... 340/657
See application file for complete search history.

(56) References Cited

U.S. PATENT DOCUMENTS

| | | | | |
|---|---|---|---|---|
| 6,122,603 | A * | 9/2000 | Budike, Jr. ............ | G01D 4/004 340/870.02 |
| 2005/0190074 | A1 | 9/2005 | Cumeralto et al. | |
| 2007/0254728 | A1 | 11/2007 | Moallemi et al. | |
| 2008/0224892 | A1 | 9/2008 | Bogolea et al. | |
| 2010/0082175 | A1* | 4/2010 | Gartner ................. | G06F 1/3203 700/295 |
| 2010/0094476 | A1* | 4/2010 | Hamilton, II ......... | G01D 4/004 700/295 |
| 2010/0161149 | A1* | 6/2010 | Nguyen ................. | G06F 1/266 700/296 |
| 2011/0251807 | A1* | 10/2011 | Rada ....................... | G01D 4/00 702/61 |
| 2011/0264286 | A1* | 10/2011 | Park ....................... | G06Q 10/00 700/286 |

(Continued)

FOREIGN PATENT DOCUMENTS

WO    2005093577    10/2005

OTHER PUBLICATIONS

"International Application Serial No. PCT/US2017/026823, International Search Report dated Jul. 20, 2017", 3 pgs.

(Continued)

*Primary Examiner* — Omar Casillashernandez
(74) *Attorney, Agent, or Firm* — Schwegman Lundberg & Woessner, P.A.

(57) ABSTRACT

Tangible interfaces for partitioned energy consumption are generally described herein. An example tangible resource device to represent a limited resource may include sensor and communication modules to receive a consumption limit of the limited resource allocated to an associated user. The sensor and communication modules may further monitor consumption of the limited resource by the associated user. The example tangible resource device may further include a display to present information indicative of the consumption limit and consumption of the limited resource by the user, and an interface module to receive input from the user to control the limited resource.

24 Claims, 6 Drawing Sheets

(56) References Cited

U.S. PATENT DOCUMENTS

| | | | | |
|---|---|---|---|---|
| 2012/0256755 | A1* | 10/2012 | Tsujimura | G01D 4/002 340/657 |
| 2013/0047006 | A1* | 2/2013 | Brown | G06F 1/3234 713/300 |
| 2013/0193753 | A1* | 8/2013 | Brey | B60R 16/0231 307/10.7 |
| 2015/0309809 | A1 | 10/2015 | Shin et al. | |
| 2015/0332031 | A1* | 11/2015 | Mistry | G06F 21/316 726/19 |
| 2016/0103441 | A1* | 4/2016 | DeVries | G05B 19/05 700/275 |
| 2016/0291671 | A1* | 10/2016 | Rider | H02J 13/0006 |

OTHER PUBLICATIONS

"International Application Serial No. PCT/US2017/026823, Written Opinion dated Jul. 20, 2017", 8 pgs.

Abdelmohsen, Sherif, "Energy Puppet: An Ambient Awareness Interface for Home Energy Consumption", 7th International Workshop on Social Intelligence Design, Designing Socially aware interactions, (Dec. 2008), 7 pgs.

Camarata, Ken, "Energy Cube and Energy Magnets", International Journal of Architectural Computing, (Jun. 2006), 19 pgs.

Camarata, Ken, "Navigational Blocks: Navigating Information Space with Tangible Media", IUI'02. ACM 1-58113-549-2/02/0001, (Jan. 2002), 9 pgs.

Froehlich, Jon, "Promoting Energy Efficient Behaviors in the Home through Feedback: The Role of Human-Computer Interaction", HCIC 2009 Workshop. UW Tech Note #09-02-01, (2009), 11 pgs.

Ishii, Hiroshi, "Tangible Bits: Toward Seamless Interfaces between People, Bits and Atoms", Proceedings of CHI 97, (Mar. 1997), 8 pgs.

Yang, Rayoung, "Living with and intelligent Thermostat: Advanced Control for Heating and Cooling Systems", UbiComp'12. ACM 978-1-4503-1224-0/12/09, (2012), 6 pgs.

Yang, Rayoung, "Learning from a Learning Thermostat: Lessons for Intelligent Systems for the Home", UbiComp'13, (Sep. 2003), 93-102.

\* cited by examiner

TANGIBLE INTERFACE FOR PARTITIONED ENERGY CONSUMPTION

BACKGROUND

Resource consumption management is continuously evolving field that involves many competing methods to reduce resource consumption. The recent development of home-based battery arrays will make users even more conscious of their individual resource consumption. Current methods for reducing resource consumption involve automatically regulating or providing information about energy and other resource consumption systems on a room-by-room basis.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Examples of a resource management system that includes tangible resource devices that reflect or represent resource allocation and consumption associated with a respective user. The tangible resource devices may also provide recommendations to users to reduce consumption of energy or other resource. The tangible resource devices may be implemented in any environment, such as a home, an office, a warehouse, or any other environment where individual user resource consumption can be monitored. The system may further include monitors or sensors that detect resource consumption, user location, etc. The system may further include a central computing device that is used to schedule designated resource consumption by each user, monitor resource consumption, provide recommendations to reduce resource consumption, update usage at the tangible resource device, or combinations thereof.

Figure 1:
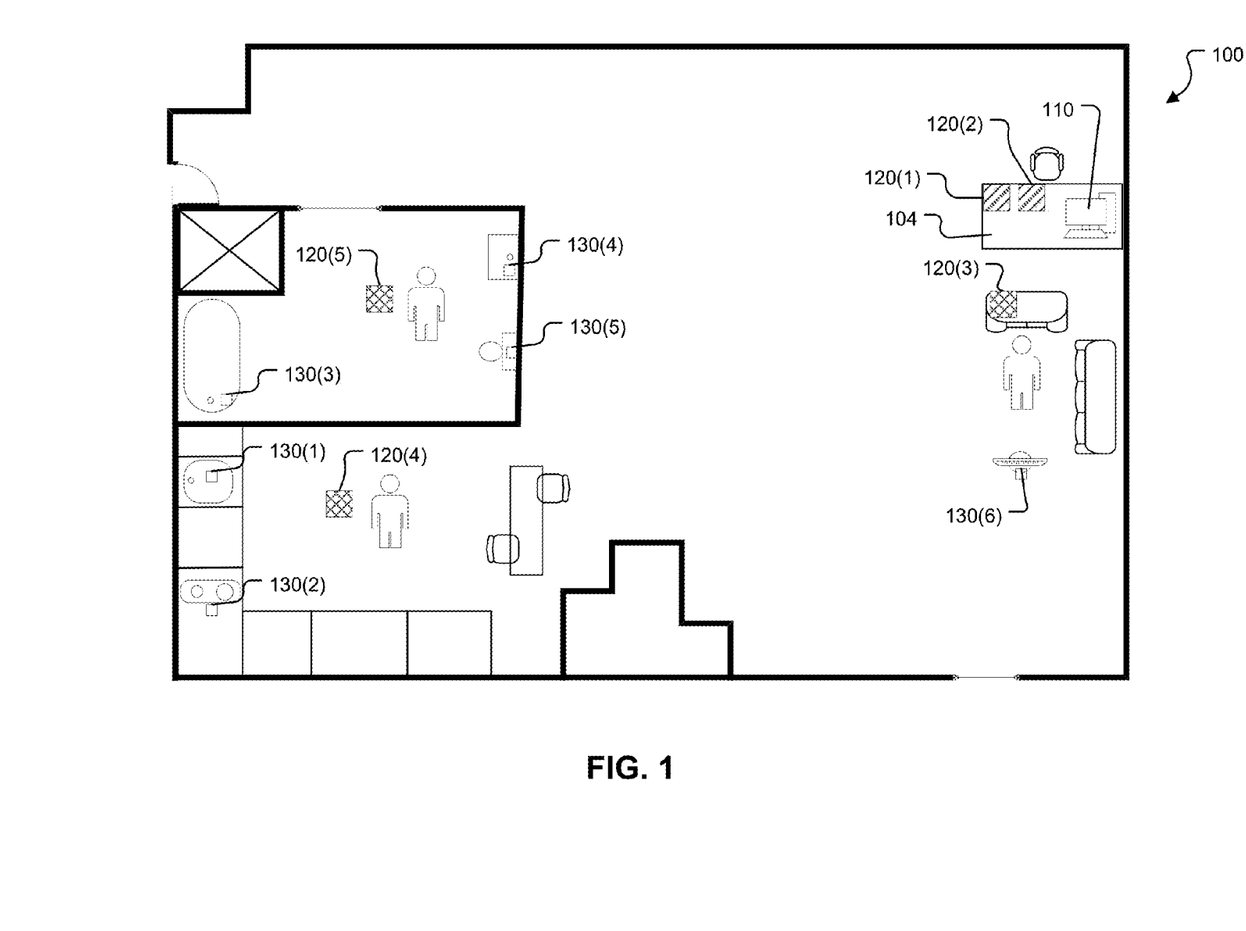
FIG. 1 illustrates a resource management system to manage resource consumption in accordance with some embodiments of the disclosure.

FIG. 1 illustrates a resource management system to manage resource consumption in accordance with some embodiments of the disclosure. The system may include a central computing device 110, tangible resource devices 120(1-5), and monitors 130(1-6) that manage resource consumption inside a dwelling 100. While only five of the tangible resource devices 120(1-5) and only six of the monitors 130(1-6) are depicted, more or less of each may be included in the system. The resources managed by the system may include energy (e.g., electricity), water, heat (e.g., electric or gas), and/or other resources that are consumed in the dwelling 100.

The central computing device 110 may include a resource-to-object correlation module, a resource goal module, a scheduler module, a user profiles module, or combinations thereof. Each of the modules of the central computing device 110 may include special circuitry and/or may configure a general-purpose hardware processor to perform specific functions. The resource-to-object correlation module may include a database that stores total resource units for each resource, as well as an allocation of resources to individual ones of the tangible resource devices 120(1-5). For example, the resource-to-object correlation module may correlate five units of electricity to a first tangible resource device 120(1), two units of electricity to a second tangible resource device 120(2), etc. The allocation may be based on an associated user, as well as a number of total units available. The resource goal module may keep track of a goal usage for a particular resource. For example, the resource goal module may set a goal of for heat/electricity/water consumption at a specified number units over certain period of time (e.g., a period of the day, specified number of hours, days, or weeks, etc.). The scheduler module may include a database that keeps track of schedules for special events or routines that happen during the day, such as eating a meal or doing dishes, laundry, or watching television as a family in the evening, etc. The user profiles module may keep track of energy consumption habits and allocations for individual users in the dwelling 100.

The tangible resource devices 120(1-5) may each be physical objects that may be carried or moved around the dwelling 100 by a user. For example, the tangible resource devices 120(1-5) may be cubes that display information on one or more sides. Each of the tangible resource devices 120(1-5) may include sensor and communication modules, an interface module, and a display. The sensor modules may sense resource consumption, sense user proximity, sense a location within the dwelling 100, or combinations thereof. The sensor modules may include sensors for light, sound, proximity, location, motion, etc. The communication module may communicate with the central computing device 110 to provide/receive a location information, provide/receive resource consumption information, provide recommendations for reducing resource consumption, and provide communications for user control change requests or for adjustments to a resource allocation/consumption. The system may include a docking station 104 to hold the tangible resource devices 120(1-5) while not in use, such as to charge or to indicate when an associated user is not home.

Each of the monitors 130(1-6) may monitor consumption directly, may be used to determine a level of consumption of a particular resource, or may determine environmental data and/or locations of users relative to resource control points in the dwelling 100. Examples of the monitors 130(1-6) may include timers, flow meters, thermometers, current or power meters, cameras, proximity sensors, audio sensors, light sensors, movement sensors, or any other sensor that may be used to monitor resource consumption, environmental data, or proximity of a user to resource control points in the dwelling 100.

In operation, the dwelling 100 may include several resources that may be consumed as users are occupying the dwelling 100, such as electricity, fuel, gas, water, other chemicals, individual lights, appliances, electronics, etc. By necessity (e.g., hard limit on available battery power) or by desire (e.g., to limit consumption in order to lower costs), users may desire that the system to assist in allocation and management of resource consumption within the dwelling 100. The central computing device 110 may communicate with the tangible resource devices 120(1-5) and the monitors 130(1-6) to allocate and monitor resource consumption of resources for individual users. Each of the tangible resource devices 120(1-5) may provide a tangible object that represents a limited resource or resources allocated to a particular user. The users may use the tangible resource devices 120(1-5) to monitor individual resource consumption, receive recommendations on how to reduce consumption, control consumption of a limited resource, receive alerts if a consumed resource is likely to run out at a current consumption rate, etc.

The resource-to-object correlation module of the central computing device 110 may store total resource units for each resource, as well as an allocation of resource units to individual ones of the tangible resource devices 120(1-5). For example, the resource-to-object correlation module may correlate five units of electricity to a first tangible resource device 120(1) (e.g., associated with a first user), two units of electricity to a second tangible resource device 120(2) (e.g., associated with a first user), etc. The allocation may be set based on the user. For example, a parent may receive a different allocation than a child, or a guest may receive a different allocation than a resident. The total resource units for a given resource may be a hard limit, such as for batter power, or may be a set limit, such as water, gas, or non-battery power consumption.

The resource goal module may determine resource consumption goals and limitations. For example, some resources may be limited by necessity (e.g., a battery) and some are limited as a goal. The goals and limitations may be determined by historical use, the number of users present in the house (e.g., as determined by a number of active ones of the tangible resource devices 120(1-5), monitoring availability of a resource, etc. The resource goal module provide the resource goals and limitations to the resource-to-object correlation module.

The scheduler module may include a database that keeps track of schedules for special events or routines that happen during the day, such as eating a meal or doing dishes, laundry, or watching television as a family in the evening, etc. For example, the scheduler module may inform the resource goals module to attribute some resource consumption associated with water flow, electricity, gas consumption to each active tangible resource device of the tangible resource devices 120(1-5) when the consumption occurs around a meal time, regardless of which user is near the resource control points.

The user profiles module may keep track of energy consumption habits and allocations for individual users in the dwelling 100. For example, certain users may be allocated more resources (e.g., parents versus children or residents versus guests). The user profiles may also track historical consumption trends for each user, and provide allocation recommendations for individual users.

Individual ones of the tangible resource devices 120(1-5) may keep track of resource usage relative to an allocated goal/limit for a particular resource. For example, one of the tangible resource devices 120(1-5) may be allocated a specified number units over certain period of time (e.g., a period of the day, specified number of hours, days, or weeks, etc.) for a user for heat/electricity/water consumption. Using onboard sensors (e.g., sensor modules) and data from the monitors 130(1-6) (e.g., received via a communication module), the one of the tangible resource devices 120(1-5) may determine consumption of a resource associated the corresponding user based on a user's proximity to a resource control point. For example, while an associated user is detected in the bathroom, the fifth tangible resource device 120(5) may detect resource consumption associated with the bathroom (e.g., water consumption detected by flow meters 130(3-5)), and update consumed levels accordingly. Thus, the tangible resource devices 120(1-5) may represent one or more limited resources for an associated user, and the resource information may be presented to the associated user via one or more displays of the tangible resource devices 120(1-5) to view past use and remaining units of the limited resources. In some examples, some resource consumption associated with community appliances (e.g., dishwasher, washer/dryer, water heater, etc.) to may be attributed to more than one active tangible resource device of the tangible resource devices 120(1-5).

The tangible resource devices 120(1-5) may also provide an alert if a resource goal/limit has been or is about to be reached or if current consumption rates will likely result in a goal/limit being exceeded. The tangible resource devices 120(1-5) may provide recommendations on how to reduce consumption, such as lowering a thermostat, turning off a light, congregating in another room, etc. The recommendations may be based on information from on-board sensors, as well as from the monitors 130(1-6). For example, if one of the tangible resource devices 120(1-5) is located in a living room with the television on and at a low volume, and a second of the tangible resource devices 120(1-5) is in another room with only the lights on with no loud noises detected (e.g., the user is reading a book), the second of the tangible resource devices 120(1-5) may provide a recommendation to the user to move to the living room to conserve energy. The resource goal module may also provide an estimated savings in consumption if the recommendation is followed. The tangible resource devices 120(1-5) may also provide an interface module that allows a user to control a resource, such as changing a thermostat temperature or turning off one or more lights. The control may be overridden at a master controller. In some examples, the tangible resource devices 120(1-5) may automatically shut off a resource once a goal or limit is reached.

The tangible resource devices 120(1-5) may be deactivated by being placed in the docking station 104. The docking station 104 may provide an interface to charge the tangible resource devices 120(1-5) and/or to reprogram the tangible resource devices 120(1-5) with updated settings or for another user.

In a non-limiting example use case, one of the tangible resource devices 120(1-5) may be associated with a particular user, and may be allocated 5 units of electricity, 20 units of water, and 4 units of heat. The particular user may carry the one of the tangible resource devices 120(1-5) with him/her as he/she moves around the dwelling 100.

The monitors 130(1-6) may include any type of sensors that may be used to determine environmental data (e.g., lights, sound, temperature, location, proximity, movement), as well as sensors that detect resource consumption (e.g., flow meters, power meters. In some examples, the monitors 130(1-6) may include additional wearable sensors or may include additional sensors associated with a user's smart phone or other electronic device that may be used to determine a user's location relative to resource control points. In some examples, user location may be based on a location of an associated one of the tangible resource devices 120(1-5). In another example, user location may be based on a wearable sensor or a user's smartphone. The monitors 130(1-6) may interface with the tangible resource devices 120(1-5) directly, or via the central computing device 110. In some examples, the monitors 130(1-6) may form an Internet of Things that are attached to various appliances, electronics, thermostats, furnaces, wall heaters, fixtures, lamps, faucets, etc. that provide smart feedback about use and status.

In a non-limiting example use case, one of the tangible resource devices 120(1-5) may be associated with a particular user, and may be allocated limits of 5 units of electricity, 20 units of water, and 4 units of heat. The particular user may move the one of the tangible resource devices 120(1-5) with him/her as he/she roams around the dwelling 100. That is, the one of the tangible resource devices 120(1-5) is a physical object that is able to be moved around the dwelling 100 with the user, and is not attached to any particular resource. When the one of the tangible resource devices 120(1-5) or monitors 130(1-6) detect that one of the electricity, water, or heat are being consumed (e.g., the shower is on), the monitors 130(1-6) and/or the one of the tangible resource devices 120(1-5) may determine whether the particular user is the person consuming the resource. The determination may be made by detecting proximity to a control point (e.g., near or in the shower when water is being consumed, etc.) for the water being consumed. The one of the tangible resource devices 120(1-5) may update previous consumption levels with the newly-detected water consumption. As consumption is updated, the one of the tangible resource devices 120(1-5) may provide alerts to the particular user when a consumption limit (e.g., the 20 units of water) has been or is about to be reached, or when a current usage rate will likely exceed the consumption limit. By providing a tangible device (e.g., object) that represents a limited resource, a user may be more likely to change consumption habits to conform to the consumption limit of the resource as compared with a system that provides information about consumption in a central location or in a system where consumption is automated.

Figure 2:
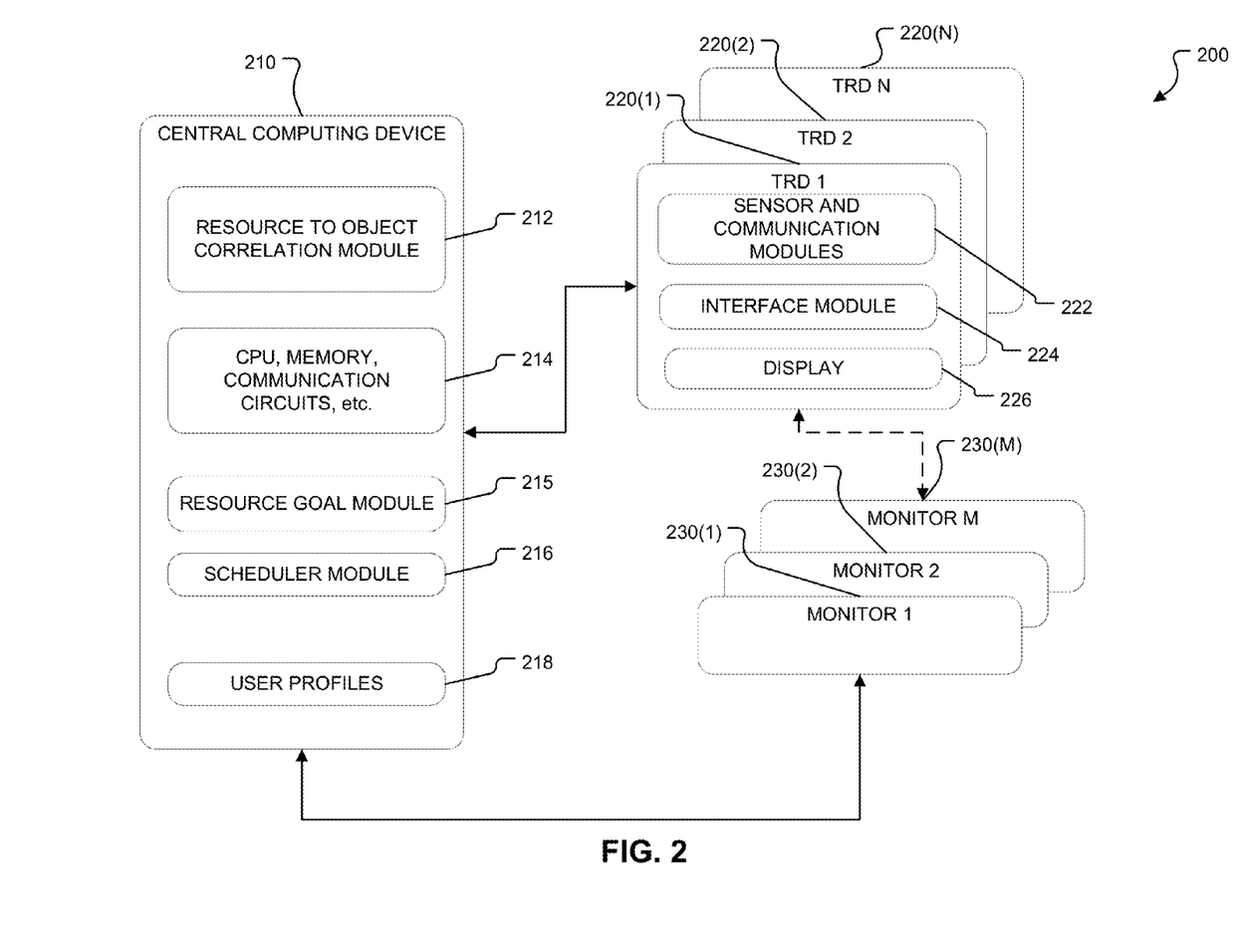
FIG. 2 illustrates a resource management system (system) 200 to manage resource consumption in accordance with some embodiments of the disclosure.

FIG. 2 illustrates a resource management system 200 to manage resource consumption in accordance with some embodiments of the disclosure. The system 200 may include a central computing device 210, tangible resource devices 220(1-N), and monitors 230(1-M) that manage resource consumption. In some examples, the system 200 may be implemented in the dwelling 100 of FIG. 1. The resources managed by the system 200 may include energy (e.g., electricity), water, heat (e.g., electric or gas), fuels, other chemicals, individual lights, applications, electronics, and/or other resources that may be consumed.

The central computing device 210 may include a resource-to-object correlation module 212, a resource goal module 215, a scheduler module 216, a user profiles module 218, or combinations thereof. The central computing device 210 may also include CPU, memory, communication circuits, etc. 214 that are used to communicate with and process data from/for the tangible resource devices 220(1-N), the monitors 230(1-M), the resource-to-object correlation module 212, the resource goal module 215, the scheduler module 216, the user profiles module 218, or combinations thereof. Each of the resource-to-object correlation module 212, the resource goal module 215, the scheduler module 216, the user profiles module 218 of the central computing device 110 may include special circuitry and/or may configure CPU, memory, communication circuits, etc. 214 to perform specific functions.

The resource-to-object correlation module 212 may include a database that stores total resource units for each resource, as well as an allocation of resources to individual ones of the tangible resource devices 220(1-N). For example, the resource-to-object correlation module 212 may correlate five units of electricity to a first tangible resource device 220(1), two units of electricity to a second tangible resource device 220(2), etc. The allocation may be based on an associated user, as well as a number of total units available. The resource goal module 215 may keep track of a goal usage for a particular resource. For example, the resource goal module 215 may set a goal of for heat/electricity/water consumption at a specified number of units over certain period of time (e.g., a period of the day, specified number of hours, days, or weeks, etc.). The scheduler module 216 may include a database that keeps track of schedules for special events or routines that happen during the day, such as eating a meal or doing dishes, laundry, or watching television as a family in the evening, etc. The user profile module 218 may keep track of energy consumption habits and allocations for individual users.

Each of the tangible resource devices 220(1-N) may include sensor and communication modules 222, an interface module 224, and a display 226. The sensor modules of the sensor and communication modules 222 may sense resource consumption, sense user proximity to resource control points, sense a location, or combinations thereof. The sensor modules may include sensors for light, sound, proximity, location, motion, etc. The communication module of the sensor and communication modules 222 may communicate with the central computing device 210 to provide/receive location information, provide/receive resource consumption information, provide recommendations for reducing resource consumption, receive and provide user requests for adjustments to a resource allocation/consumption, receive and provide user requests to control a resource, or combinations thereof. The system 200 may include a docking station to hold the tangible resource devices 220(1-N) while not in use, such as to charge or to indicate when individual ones of the tangible resource devices 220(1-N) are active or inactive.

Each of the monitors 230(1-M) may monitor consumption directly, may be used to determine a level of consumption of a particular resource, or may determine environmental data and/or locations of users relative to resource control points. Examples of the monitors 230(1-M) may include timers, flow meters, thermometers, current or power meters, cameras, proximity sensors, audio sensors, light sensors, movement sensors, or any other sensor that may be used to monitor resource consumption, environmental data, or location of a user relative to resource control points.

In operation, the system 200 include monitor several resources that may be consumed by users, such as electricity, fuel, gas, water, other chemicals, individual lights, appliances, electronics, etc. The central computing device 210 may communicate with the tangible resource devices 220

(1-N) and the monitors 230(1-M) to allocate and monitor resource consumption of resources for individual users. Each of the tangible resource devices 220(1-N) may provide a tangible object that represents a limited resource or resources allocated to a particular user. The users may use the tangible resource devices 220(1-N) to monitor individual resource consumption, receive recommendations on how to reduce consumption, control consumption of a limited resource, receive alerts if a consumed resource is likely to run out at a current consumption rate, etc.

The resource-to-object correlation module 212 of the central computing device 210 may store total resource units for each resource, as well as an allocation of resource units to individual ones of the tangible resource devices 220(1-N). The allocation may be set based on the user. For example, a parent may receive a different allocation than a child, or a guest may receive a different allocation than a resident. The total resource units for a given resource may be a hard limit, such as for batter power, or may be a set limit, such as water, gas, or non-battery power consumption.

The resource goal module 215 may determine resource consumption goals and limitations. For example, some resources are limited by necessity (e.g., a battery) and some are limited artificially as a goal. The goals and limitations may be determined by historical use, the number of users present in the house (e.g., as determined by a number of active ones of the tangible resource devices 220(1-N), monitoring availability of a resource, etc. The resource goal module 215 provide the resource goals and limitations to the resource-to-object correlation module 212.

The scheduler module 216 may include a database that keeps track of schedules for special events or routines that happen during the day, such as eating a meal or doing dishes, laundry, or watching television as a family in the evening, etc. For example, the scheduler module 216 may inform the resource goals module to attribute some resource consumption associated with water flow, electricity, gas consumption to each active tangible resource device of the tangible resource devices 220(1-N) when the consumption occurs around a meal time.

The user profile module 218 may keep track of energy consumption habits and allocations for individual users. For example, certain users may be allocated more resources (e.g., parents versus children). The user profiles may also track historical consumption trends for each user, and provide allocation recommendations for individual users.

Individual ones of the tangible resource devices 220(1-N) may keep track of resource usage relative to an allocated goal/limit for a particular resource. For example, one of the tangible resource devices 220(1-N) may be allocated a specified number units over certain period of time (e.g., a period of the day, specified number of hours, days, or weeks, etc.) for a user for heat/electricity/water consumption. Using onboard sensors and the monitors 230(1-M), the one of the tangible resource devices 220(1-N) may determine consumption of a resource associated the corresponding user based on the user's location relative to a resource control point. For example, while an associated user is detected in the kitchen, one of the tangible resource devices 220(1-N) may detect resource consumption associated with the kitchen via the monitors 230(1-M) (e.g., water consumption detected by flow meters, electricity from the stove, oven, microwave, or other appliance, etc.), and update consumed levels accordingly. Thus, each of tangible resource devices 220(1-N) may represent one or more limited resources for the associated user, and the user may refer to a corresponding one of the tangible resource devices 220(1-N) to view past use and remaining units of the limited resources. In some examples, some resource consumption associated with community appliances (e.g., dishwasher, washer/dryer, water heater, etc.) to may be attributed to more than one active tangible resource device of the tangible resource devices 220(1-N).

The tangible resource devices 220(1-N) may also provide an alert if a resource goal/limit has been or is about to be reached or if current consumption rates will likely result in a goal/limit being exceeded. The tangible resource devices 220(1-N) may provide recommendations on how to reduce consumption, such as lowering a thermostat, turning off a light, congregating in another room, etc. The recommendations may be based on information from on-board sensors, as well as from the monitors 230(1-M). For example, if a first user associated with one of the tangible resource devices 220(1-N) is located in a living room with the television on and at a low volume, and a second user associated a second of the tangible resource devices 220(1-N) is located in another room with only the lights on with no loud noises detected (e.g., the second user is reading a book), the second of the tangible resource devices 220(1-N) may provide a recommendation to the second user to move to the living room to conserve energy. The resource goal module 215 may also provide an estimated savings in consumption if the recommendation is followed. The tangible resource devices 220(1-N) may also provide an interface that allows a user to control a resource, such as changing a thermostat temperature or turning off one or more lights. The control may be overridden at a master controller. In some examples, the tangible resource devices 220(1-N) may automatically shut off a resource once a goal or limit has been reached.

The tangible resource devices 220(1-N) may be deactivated by being placed in the docking station (not shown). The docking station may provide an interface to charge the tangible resource devices 220(1-N) and/or to reprogram the tangible resource devices 220(1-N) with updated settings or for another user.

The monitors 230(1-M) may include any type of sensors that may be used to determine environmental data (e.g., lights, sound, temperature, location, proximity, movement), as well as sensors that detect resource consumption (e.g., flow meters, power meters. In some examples, the monitors 230(1-M) may include additional wearable sensors or may include additional sensors associated with a user's smart phone or other electronic device that may be used to determine a user's location relative to resource control points. In some examples, user location may be based on a location of an associated one of the tangible resource devices 220(1-N). In another example, user location may be based on a wearable sensor or a user's smartphone. The monitors 230(1-M) may interface with the tangible resource devices 220(1-N) directly, or via the central computing device 210.

By providing a tangible resource device that represents a limited resource, a user may be more likely to change consumption habits to conform to the consumption limit of the resource as compared with a system that provides information about consumption in a central location or in a system where consumption is automated.

Figure 3A:
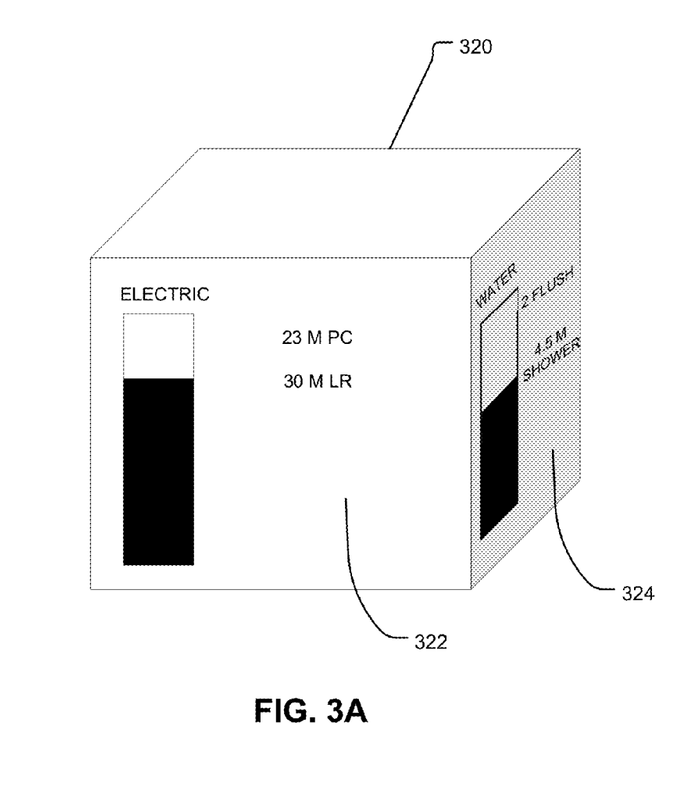
FIGS. 3A and 3B illustrate an exemplary tangible resource device 300 in accordance with some embodiments of the disclosure.
Figure 3B:
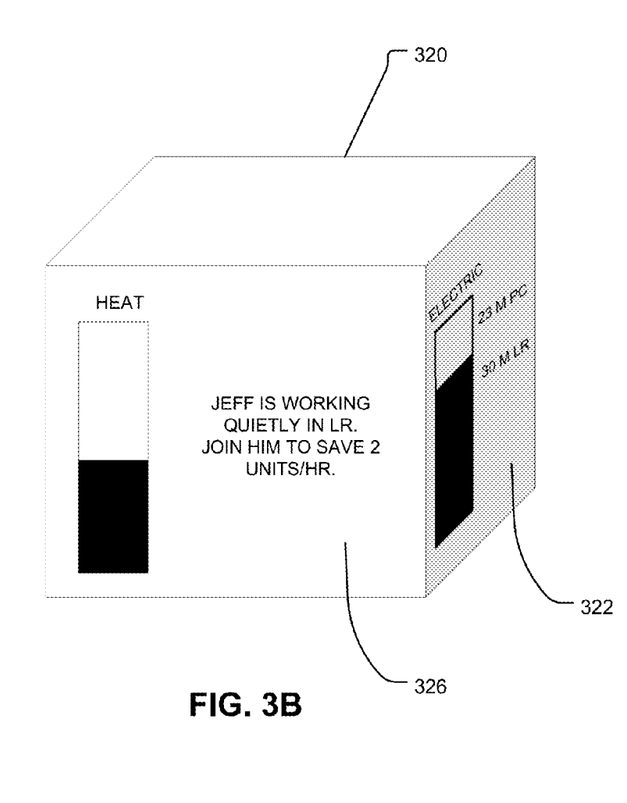

FIGS. 3A and 3B illustrate an exemplary tangible resource device 300 in accordance with some embodiments of the disclosure. The tangible resource device 300 may be implemented in any of the tangible resource devices 120(1-5) of FIG. 1, the tangible resource devices 220(1-N) of FIG. 2, or combinations thereof. The tangible resource device 300 may be a cube or some other shape with displays on one or more sides. For example, a first side 322 may include a first display (e.g., showing electricity goal and consumption in this example), a second side 324 may include a second display (e.g., showing a water goal and consumption in this example), a third side 326 may include a third display (e.g., showing a heat goal and consumption in this example), etc. The third side 326 also depicts a recommendation, in this example. The tangible resource device 300 depicted in FIGS. 3A and 3B are exemplary and non-limiting. It is understood that the tangible resource device 300 may have a different shape, may have more or less displays than depicted, may monitor different resources or present different information on each display, etc.

Figure 4:
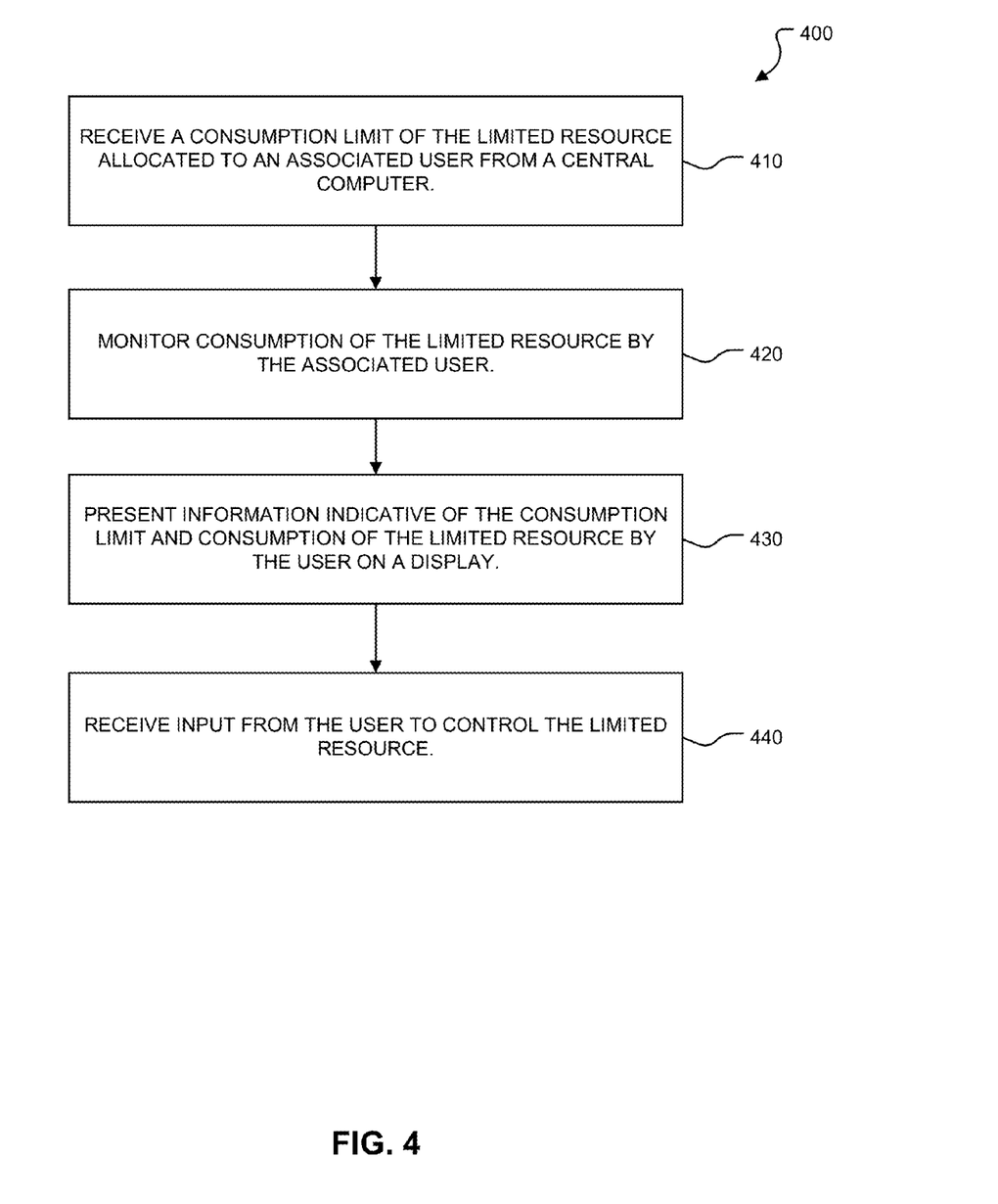
FIG. 4 illustrates a flow diagram of a method to represent a limited resource in a tangible resource device in accordance with some embodiments of the disclosure.

FIG. 4 illustrates a flow diagram of a method 400 to represent a limited resource in a tangible resource device in accordance with some embodiments of the disclosure. The method 400 may be implemented in any of the tangible resource devices 120(1-5) of FIG. 1, any of the tangible resource devices 220(1-N) of FIG. 2, the 300 of FIGS. 3A and 3B, or combinations thereof.

The method 400 may include receiving a consumption limit of the limited resource allocated to an associated user, at 410. The consumption limit may be received at the sensor and communication modules 222 of FIG. 2.

The method 400 may include monitoring consumption of the limited resource by the associated user, at 420. The monitoring may be implemented in the sensor and communication modules 222 of FIG. 2. The limited resource may include one of electricity, fuel, gas, water, another chemical, an individual light, an appliance, an electronic device, etc. The method 400 may further include determining consumption of the limited resource by the user based on a location of the user relative to a control point associated with the limited resource. The method 400 may further include determining the location of the user relative to the control point associated with the limited resource is based on data collected by onboard sensors or an external monitor. The external monitor may include the external monitor includes a smart phone, a proximity sensor, a camera, a motion sensor, a wearable device, or combinations thereof. The external monitor may include any of the monitors 130(1-6) of FIG. 1, any of the monitors 230(1-M) of FIG. 2, or combinations thereof.

The method 400 may further include determining consumption of the limited resource by the associated user based on data received from a plurality of monitors. The plurality of monitors may include the monitors 130(1-6) of FIG. 1, the monitors 230(1-M) of FIG. 2, or combinations thereof. The plurality of monitors may include timers, flow meters, thermometers, current or power meters, cameras, proximity sensors, audio sensors, light sensors, movement sensors, or combinations thereof. The data received from the plurality of monitors includes consumption data associated with the limited resource and environmental data. In some examples, the method 400 may further include providing a recommendation to reduce consumption of the limited resource based on the data received from the plurality of monitors, and updating the display to provide the recommendation to the user. In some examples, the method 400 may further include providing an alert based on the data received from the plurality of monitors, and updating the display to provide the alert to the user. The alert may be based on a consumption rate of the limited resource determined from the data or may be based on whether the consumption limit has been reached. The method 400 may further include controlling consumption of the limited resource responsive to the alert.

The method 400 may further include presenting information indicative of the consumption limit and consumption of the limited resource by the user on a display, at 430. The information may be presented on the display 226 of FIG. 2 or any of the displays of the first side 322, the second side 324, or the third side 326 of the tangible resource object 300 of FIGS. 3A and 3B. The method 400 may further include receiving input from the user to control the limited resource, at 430. The input from the user may be received via the interface module 224 of FIG. 2.

In some examples, the method 400 may further include receiving a second consumption limit of a second limited resource allocated to the associated user, monitoring consumption of the second limited resource by the associated user, and presenting information indicative of the second consumption limit and consumption of the second limited resource by the user on a second display. The second display may include any of the displays of the first side 322, the second side 324, or the third side 326 of the tangible resource object 300 of FIGS. 3A and 3B.

Figure 5:
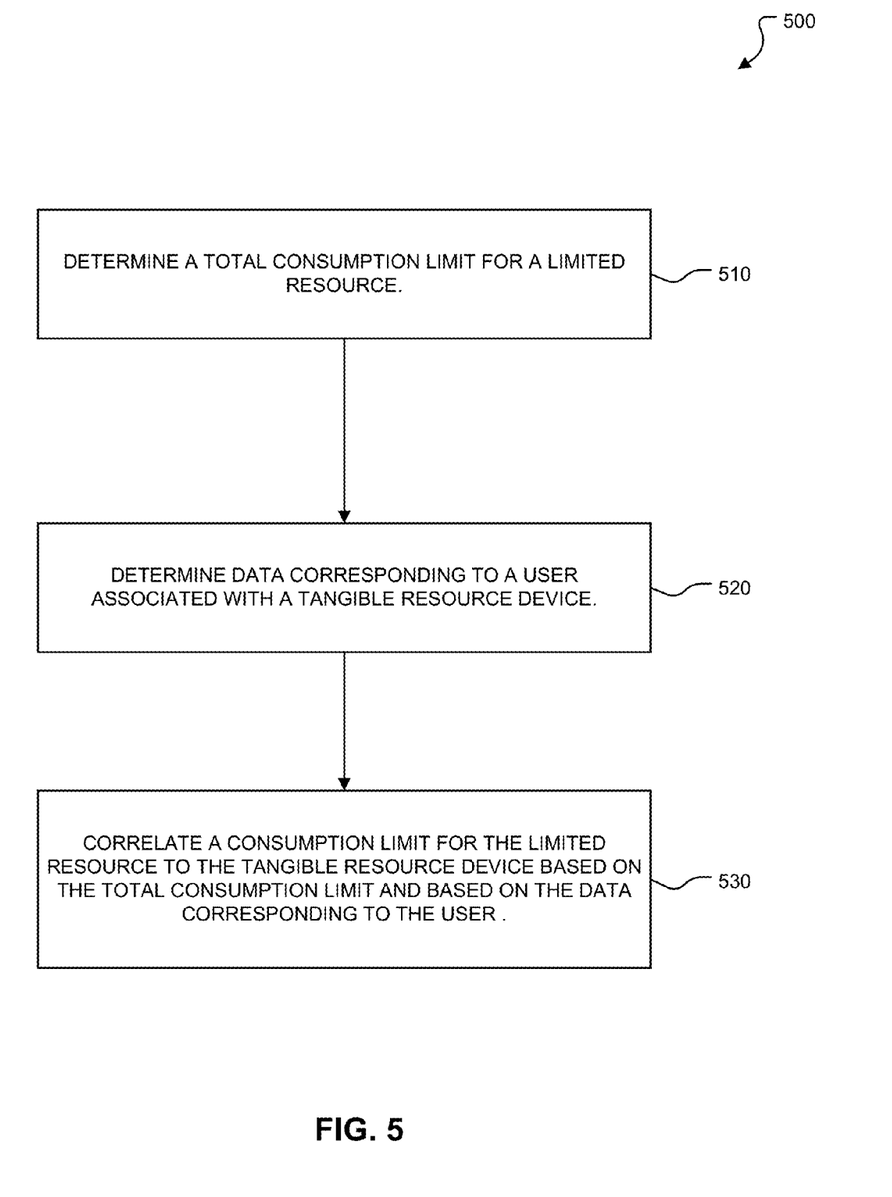
FIG. 5 illustrates a flow diagram of a method for allocation of a limited resource to a tangible resource device in accordance with some embodiments of the disclosure.

FIG. 5 illustrates a flow diagram of a method 500 for allocation of a limited resource to a tangible resource device in accordance with some embodiments of the disclosure. The method 500 may be implemented in the central computing device 110 of FIG. 1, the central computing device 210 of FIG. 2, or combinations thereof.

The method 500 may include determining a total consumption limit for a limited resource, at 510. The total compensation limited may be determined at a resource goal module, such as the resource goal module 215 of FIG. 2.

The method 500 may include determining data corresponding to a user associated with a tangible resource device, 520. The data corresponding to the user may be determined at a user profiles module, such as the user profiles module 218 of FIG. 2. Determining the total consumption limit for the limited resource comprises monitoring the limited resource, reviewing historical consumption data, or combinations thereof.

The method 500 may further include correlating a consumption limit for a limited resource to the tangible resource device based on the total consumption limit and based on the data corresponding to the user, at 530. The correlation of the consumption limit for a limited resource to a tangible resource device may be formed at a resource-to-object correlation module, such as the resource-to-object correlation module 212 of FIG. 2. In some examples, correlating the consumption limit to the tangible resource device based on the data corresponding to the user comprises setting the consumption limited based on historical consumption data associated with the user. In some examples, correlating the consumption limit for the limited resource to the tangible resource device based on the data corresponding to the user includes setting the consumption limited based on whether the user is a parent, child or guest. The method 500 may further include providing schedule data related to routines associated with the limited resource, where correlation of the consumption limit for the limited resource to the tangible resource device is further based on the schedule data.

Figure 6:
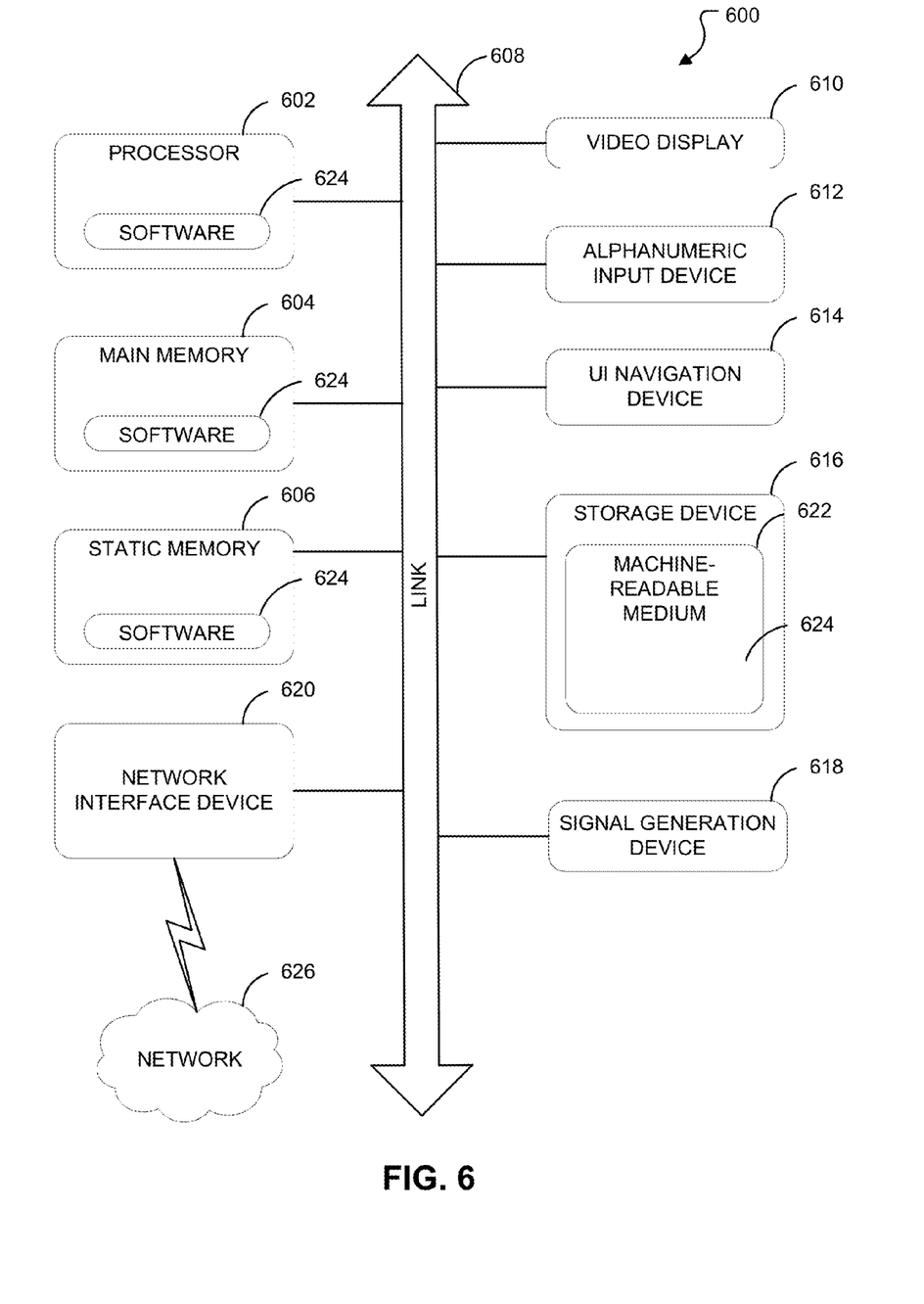
FIG. 6 illustrates a block diagram illustrating a machine in the example form of a computer system in accordance with some embodiments of the disclosure.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor unit 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor unit 602 during execution thereof by the computer system 600, with the main memory 604, static memory 606, and the processor unit 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

ADDITIONAL NOTES & EXAMPLES

Example 1 is a tangible resource device to represent a limited resource, the tangible resource device comprising: sensor and communication modules to receive a consumption limit of the limited resource allocated to an associated user, the sensor and communication modules further to monitor consumption of the limited resource by the associated user; a display to present information indicative of the consumption limit and consumption of the limited resource by the user; and an interface module to receive input from the user to control the limited resource.

In Example 2, the subject matter of Example 1 optionally includes wherein the sensor and communication modules determine consumption of the limited resource by the user based on a location of the user relative to a control point associated with the limited resource.

In Example 3, the subject matter of Example 2 optionally includes wherein the sensor and communication modules determine the location of the user relative to the control point associated with the limited resource based on data collected by onboard sensors.

In Example 4, the subject matter of any one or more of Examples 2-3 optionally include wherein the sensor and communication modules determine the location of the user relative to the control point associated with the limited resource based on data received from an external monitor.

In Example 5, the subject matter of Example 4 optionally includes wherein the external monitor includes a smart phone, a proximity sensor, a camera, a motion sensor, a wearable device, or combinations thereof.

In Example 6, the subject matter of any one or more of Examples 1-5 optionally include wherein the sensor and communication modules determine consumption of the limited resource by the associated user based on data received from a plurality of monitors.

In Example 7, the subject matter of Example 6 optionally includes wherein the data received from the plurality of monitors includes consumption data associated with the limited resource and environmental data.

In Example 8, the subject matter of Example 7 optionally includes wherein the sensor and communication modules further to provide a recommendation to reduce consumption of the limited resource based on the data received from the plurality of monitors, wherein the display further to provide the recommendation to the user.

In Example 9, the subject matter of any one or more of Examples 6-8 optionally include wherein the sensor and communication modules further to provide an alert to the user based on the data received from the plurality of monitors, wherein the display further to provide the alert to the user.

In Example 10, the subject matter of any one or more of Examples 6-9 optionally include wherein the sensor and communication modules to provide the alert to the user based on a consumption rate of the limited resource determined from the data.

In Example 11, the subject matter of any one or more of Examples 6-10 optionally include wherein the plurality of monitors includes timers, flow meters, thermometers, current or power meters, cameras, proximity sensors, audio sensors, light sensors, movement sensors, or combinations thereof.

In Example 12, the subject matter of any one or more of Examples 1-11 optionally include wherein the sensor and communication modules further to provide an alert to the user when the consumption limit has been reached, wherein the display further to provide the alert to the user.

In Example 13, the subject matter of Example 12 optionally includes wherein the sensor and communication modules further to control consumption of the limited resource responsive to the alert.

In Example 14, the subject matter of any one or more of Examples 1-13 optionally include wherein the sensor and communication modules to receive a second consumption limit of a second limited resource allocated to the associated user, the sensor and communication modules further to monitor consumption of the second limited resource by the associated user, the tangible resource further comprising a second display to present information indicative of the second consumption limit and consumption of the second limited resource by the user.

In Example 15, the subject matter of any one or more of Examples 1-14 optionally include wherein the limited resource is one of electricity from a grid, electrical capacity stored in one or more batteries, potential electrical collection from one or more solar panels, fuel, gas, water, another chemical, an individual light, an appliance, or an electronic device.

In Example 16, the subject matter of any one or more of Examples 1-15 optionally include wherein the sensor and communication modules to deactivate when connected to a docking station.

Example 17 is a central computing device to allocate a limited resource to a tangible resource device, the central computing device comprising: a resource-to-object correlation module to correlate a consumption limit for a limited resource to a tangible resource device based on a total consumption limit associated with the limited resource and based on data corresponding to a user associated with the tangible resource device; a resource goal module to determine the total consumption limit for the limited resource; and a user profile module to provide the data corresponding to the user.

In Example 18, the subject matter of Example 17 optionally includes wherein determination of the consumption limit for the limited resource includes the resource goal module monitoring the limited resource, reviewing historical consumption data, or combinations thereof.

In Example 19, the subject matter of any one or more of Examples 17-18 optionally include wherein correlation of the consumption limit for the limited resource to the tangible resource device based on the data corresponding to a user associated with the tangible resource device includes the resource-to-object correlation module setting the consumption limited based on historical consumption data corresponding to the user.

In Example 20, the subject matter of any one or more of Examples 17-19 optionally include wherein correlation of the consumption limit for the limited resource to the tangible resource device based on the data corresponding to a user associated with the tangible resource device includes the resource-to-object correlation module setting the consumption limited based on whether the user is a parent, child or guest.

In Example 21, the subject matter of any one or more of Examples 17-20 optionally include a scheduler module to provide schedule data related to routines associated with the limited resource, wherein correlation of the consumption limit for the limited resource to the tangible resource device is further based on the schedule data.

Example 22 is a method to represent a limited resource in a tangible resource device comprising: receiving a consumption limit of the limited resource allocated to an associated user; monitoring consumption of the limited resource by the associated user; presenting information indicative of the consumption limit and consumption of the limited resource by the user on a display; and receiving input from the user to control the limited resource.

In Example 23, the subject matter of Example 22 optionally includes determining consumption of the limited resource by the user based on a location of the user relative to a control point associated with the limited resource.

In Example 24, the subject matter of Example 23 optionally includes wherein determining the location of the user relative to the control point associated with the limited resource is based on data collected by onboard sensors.

In Example 25, the subject matter of any one or more of Examples 23-24 optionally include wherein determining the location of the user relative to the control point associated with the limited resource is based on data received from an external monitor.

In Example 26, the subject matter of Example 25 optionally includes wherein the external monitor includes a smart phone, a proximity sensor, a camera, a motion sensor, a wearable device, or combinations thereof.

In Example 27, the subject matter of any one or more of Examples 22-26 optionally include determining consumption of the limited resource by the associated user based on data received from a plurality of monitors.

In Example 28, the subject matter of Example 27 optionally includes wherein the data received from the plurality of monitors includes consumption data associated with the limited resource and environmental data.

In Example 29, the subject matter of Example 28 optionally includes providing a recommendation to reduce consumption of the limited resource based on the data received from the plurality of monitors; and updating the display to provide the recommendation to the user.

In Example 30, the subject matter of any one or more of Examples 27-29 optionally include providing an alert to the user based on the data received from the plurality of monitors; and updating the display to provide the alert to the user.

In Example 31, the subject matter of any one or more of Examples 27-30 optionally include wherein provision of the alert to the user is based on a consumption rate of the limited resource determined from the data.

In Example 32, the subject matter of any one or more of Examples 27-31 optionally include wherein the plurality of monitors includes timers, flow meters, thermometers, current or power meters, cameras, proximity sensors, audio sensors, light sensors, movement sensors, or combinations thereof.

In Example 33, the subject matter of any one or more of Examples 22-32 optionally include providing an alert to the user when the consumption limit has been reached.

In Example 34, the subject matter of Example 33 optionally includes controlling consumption of the limited resource responsive to the alert.

In Example 35, the subject matter of any one or more of Examples 22-34 optionally include receiving a second consumption limit of a second limited resource allocated to the associated user; monitoring consumption of the second limited resource by the associated user; and presenting information indicative of the second consumption limit and consumption of the second limited resource by the user on a second display.

In Example 36, the subject matter of any one or more of Examples 22-35 optionally include wherein the limited resource is one of electricity from a grid, electrical capacity stored in one or more batteries, potential electrical collection from one or more solar panels, fuel, gas, water, another chemical, an individual light, an appliance, or an electronic device.

Example 37 is at least one medium including instructions that, when executed on a machine cause the machine to perform any of the methods of Examples 22-36.

Example 38 is an apparatus comprising means for performing any of the methods of Examples 22-36.

Example 39 is a method for allocation of a limited resource to a tangible resource device comprising: determining a total consumption limit for a limited resource; determining data corresponding to a user associated with a tangible resource device; and correlating a consumption limit for a limited resource to the tangible resource device based on the total consumption limit and based on the data corresponding to the user.

In Example 40, the subject matter of Example 39 optionally includes wherein determining the total consumption limit for the limited resource comprises monitoring the limited resource, reviewing historical consumption data, or combinations thereof.

In Example 41, the subject matter of any one or more of Examples 39-40 optionally include wherein correlating the consumption limit to the tangible resource device based on the data corresponding to the user comprises setting the consumption limited based on historical consumption data associated with the user.

In Example 42, the subject matter of any one or more of Examples 39-41 optionally include wherein correlating the consumption limit to the tangible resource device based on the data corresponding to the user includes setting the consumption limited based on whether the user is a parent, child or guest.

In Example 43, the subject matter of any one or more of Examples 39-42 optionally include providing schedule data related to routines associated with the limited resource, wherein correlation of the consumption limit for the limited resource to the tangible resource device is further based on the schedule data.

Example 44 is at least one medium including instructions that, when executed on a machine cause the machine to perform any of the methods of Examples 39-43.

Example 45 is an apparatus comprising means for performing any of the methods of Examples 39-43.

Example 46 is an apparatus to present a limited resource comprising: means for receiving a consumption limit of the limited resource allocated to an associated user; means for monitoring consumption of the limited resource by the associated user; means for presenting information indicative of the consumption limit and consumption of the limited resource by the user on a display; and means for receiving input from the user to control the limited resource.

In Example 47, the subject matter of Example 46 optionally includes means for determining consumption of the limited resource by the user based on a location of the user relative to a control point associated with the limited resource.

In Example 48, the subject matter of Example 47 optionally includes wherein means for determining the location of the user relative to the control point associated with the limited resource is based on data collected by onboard sensors.

In Example 49, the subject matter of any one or more of Examples 47-48 optionally include wherein means for determining the location of the user relative to the control point associated with the limited resource is based on data received from an external monitor.

In Example 50, the subject matter of Example 49 optionally includes wherein the external monitor includes a smart phone, a proximity sensor, a camera, a motion sensor, a wearable device, or combinations thereof.

In Example 51, the subject matter of any one or more of Examples 46-50 optionally include means for determining consumption of the limited resource by the associated user based on data received from a plurality of monitors.

In Example 52, the subject matter of Example 51 optionally includes wherein the data received from the plurality of monitors includes consumption data associated with the limited resource and environmental data.

In Example 53, the subject matter of Example 52 optionally includes means for providing a recommendation to reduce consumption of the limited resource based on the data received from the plurality of monitors; and means for updating the display to provide the recommendation to the user.

In Example 54, the subject matter of any one or more of Examples 51-53 optionally include means for providing an alert to the user based on the data received from the plurality of monitors; and means for updating the display to provide the alert to the user.

In Example 55, the subject matter of any one or more of Examples 51-54 optionally include wherein provision of the alert to the user is based on a consumption rate of the limited resource determined from the data.

In Example 56, the subject matter of any one or more of Examples 51-55 optionally include wherein the plurality of monitors includes timers, flow meters, thermometers, current or power meters, cameras, proximity sensors, audio sensors, light sensors, movement sensors, or combinations thereof.

In Example 57, the subject matter of any one or more of Examples 46-56 optionally include means for providing an alert to the user when the consumption limit has been reached.

In Example 58, the subject matter of Example 57 optionally includes means for controlling consumption of the limited resource responsive to the alert.

In Example 59, the subject matter of any one or more of Examples 46-58 optionally include means for receiving a second consumption limit of a second limited resource allocated to the associated user; means for monitoring consumption of the second limited resource by the associated user; and means for presenting information indicative of the second consumption limit and consumption of the second limited resource by the user on a second display.

In Example 60, the subject matter of any one or more of Examples 46-59 optionally include wherein the limited resource is one of electricity from a grid, electrical capacity stored in one or more batteries, potential electrical collection from one or more solar panels, fuel, gas, water, another chemical, an individual light, an appliance, or an electronic device.

Example 61 is an apparatus for allocation of a limited resource to a tangible resource device comprising: means for determining a total consumption limit for a limited resource; means for determining data corresponding to a user associated with a tangible resource device; and means for correlating a consumption limit for a limited resource to the tangible resource device based on the total consumption limit and based on the data corresponding to the user.

In Example 62, the subject matter of Example 61 optionally includes wherein means for determining the total consumption limit for the limited resource comprises means for monitoring the limited resource, reviewing historical consumption data, or combinations thereof.

In Example 63, the subject matter of any one or more of Examples 61-62 optionally include wherein means for correlating the consumption limit to the tangible resource device based on the data corresponding to the user comprises means for setting the consumption limited based on historical consumption data associated with the user.

In Example 64, the subject matter of any one or more of Examples 61-63 optionally include wherein means for correlating the consumption limit to the tangible resource device based on the data corresponding to the user includes means for setting the consumption limited based on whether the user is a parent, child or guest.

In Example 65, the subject matter of any one or more of Examples 61-64 optionally include means for providing schedule data related to routines associated with the limited resource, wherein correlation of the consumption limit for the limited resource to the tangible resource device is further based on the schedule data.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A tangible resource device to represent a limited resource, the tangible resource device comprising:
   a housing to enable carrying of the tangible resource device by a user;
   sensor and communication modules to:
      receive a consumption limit of the limited resource allocated to the user;
      determine a location of the tangible resource device with respect to a control point associated with the limited resource; and
      monitor consumption of the limited resource by the user in the location, the monitor of the consumption of the limited resource being an apportionment of the limited resource to the user where multiple users consume the limited resource;
   a display to present information indicative of the consumption limit and consumption of the limited resource by the user, the information indicative of the consumption limit including notification that the limited resource will be automatically shut off if the consumption limit is reached; and
   an interface module to receive input from the user to control the limited resource.

2. The tangible resource device of claim 1, wherein the sensor and communication modules determine the location of the user relative to the control point associated with the limited resource based on data collected by onboard sensors.

3. The tangible resource device of claim 1, wherein the sensor and communication modules determine the location of the user relative to the control point associated with the limited resource based on data received from an external monitoring device.

4. The tangible resource device of claim 3, wherein the external monitoring device includes a smart phone, a proximity sensor, a camera, a motion sensor, a wearable device, or combinations thereof.

5. The tangible resource device of claim 1, wherein the sensor and communication modules determine consumption of the limited resource by the user based on data received from a plurality of monitoring devices.

6. The tangible resource device of claim 5, wherein the data received from the plurality of monitoring devices includes consumption data associated with the limited resource and environmental data.

7. The tangible resource device of claim 6, wherein the sensor and communication modules further provide a recommendation to reduce consumption of the limited resource based on the data received from the plurality of monitoring devices, wherein the display further provides the recommendation to the user.

8. The tangible resource device of claim 5, wherein the sensor and communication modules further provide an alert to the user based on the data received from the plurality of monitoring devices, wherein the display further provides the alert to the user.

9. The tangible resource device of claim 8, wherein the sensor and communication modules provide the alert to the user based on a consumption rate of the limited resource determined from the data.

10. The tangible resource device of claim 5, wherein the plurality of monitoring devices includes timers, flow meters, thermometers, current or power meters, cameras, proximity sensors, audio sensors, light sensors, movement sensors, or combinations thereof.

11. The tangible resource device of claim 1, wherein the sensor and communication modules provide an alert to the user when the consumption limit has been reached, wherein the display further to provide the alert to the user.

12. A method to represent limited resource in a tangible resource device comprising:
   receiving a consumption limit of the limited resource allocated to a user;
   determining a location of the tangible resource device with respect to a control point associated with the limited resource, wherein the tangible resource device comprises a housing to enable the user to carry the tangible resource device to the location;
   monitoring consumption of the limited resource by the user in the location, the monitoring of the consumption of the limited resource being an apportionment of the limited resource to the user where multiple users consume the limited resource;
   presenting information indicative of the consumption limit and consumption of the limited resource by the user on a display, the information indicative of the consumption limit including notification that the limited resource will be automatically shut off if the consumption limit is reached; and
   receiving input from the user to control the limited resource.

13. The method of claim 12, further comprising providing an alert to the user when the consumption limit has been reached.

14. The method of claim 13, further comprising controlling consumption of the limited resource responsive to the alert.

15. The method of claim 12, further comprising:
   receiving a second consumption limit of a second limited resource allocated to the user;
   monitoring consumption of the second limited resource by the user; and
   presenting information indicative of the second consumption limit and consumption of the second limited resource by the user on a second display.

16. The method of claim 12, wherein the limited resource is one of electricity from a grid, electrical capacity stored in one or more batteries, potential electrical collection from one or more solar panels, fuel, gas, water, another chemical, an individual light, an appliance, or an electronic device.

17. The tangible resource device of claim 1, wherein the tangible resource device is arranged to shut off the resource via the control point in response to reaching the consumption limit.

18. The method of claim 12, comprising unit the resource control point in response to reaching the consumption limit.

19. At least one non-transitory machine readable medium including instructions that, when executed by a processor of a tangible resource device, cause the tangible resource device to represent a limited resource via operations comprising:
receiving a consumption limit of the limited resource allocated to a user;
determining a location of the tangible resource device with respect to a control point associated with the limited resource, wherein the tangible resource device comprises a housing to enable the user to carry the tangible resource device to the location;
monitoring consumption of the limited resource by the user in the location, the monitoring of the consumption of the limited resource being an apportionment of the limited resource to the user where multiple users consume the limited resource;
presenting information indicative of the consumption limit and consumption of the limited resource by the user on a display, the information indicative of the consumption limit including notification that the limited resource will be automatically shut off if the consumption limit is reached; and
receiving input from the user to control the limited resource.

20. The method of claim 19, wherein the operations further comprise providing an alert to the user when the consumption limit has been reached.

21. The method of claim 20, wherein the operations further comprise controlling consumption of the limited resource responsive to the alert.

22. The method of claim 19, wherein the operations further comprise:
receiving a second consumption limit of a second limited resource allocated to the user;
monitoring consumption of the second limited resource by the user; and
presenting information indicative of the second consumption limit and consumption of the second limited resource by the user on a second display.

23. The method of claim 19, wherein the limited resource is one of electricity from a grid, electrical capacity stored in one or more batteries, potential electrical collection horn one or more solar panels, fuel, gas, water, another chemical, an individual light, an appliance, or an electronic device.

24. The method of claim 19, wherein the operations further comprise shutting off the resource via the control point in response to reaching the consumption limit.

* * * * *

UNITED STATES PATENT AND TRADEMARK OFFICE
CERTIFICATE OF CORRECTION

PATENT NO. : 10,157,531 B2
APPLICATION NO. : 15/198743
DATED : December 18, 2018
INVENTOR(S) : Glen J. Anderson Page 1 of 1

It is certified that error appears in the above-identified patent and that said Letters Patent is hereby corrected as shown below:

In the Claims

Column 20, Line 23, Claim 12, after "represent", insert --a--

Column 21, Line 1, Claim 18, delete "unit" and insert --shutting off-- therefor

Column 21, Line 2, Claim 18, before "control", insert --via the--

Column 22, Line 20, Claim 23, delete "horn" and insert --from-- therefor

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*